(12) United States Patent
Stifter et al.

(10) Patent No.: US 11,845,019 B2
(45) Date of Patent: Dec. 19, 2023

(54) LARGE FORMAT MELT-BLOWN DEPTH FILTER CARTRIDGE

(71) Applicant: BL TECHNOLOGIES, INC., Minnetonka, MN (US)

(72) Inventors: Travis Gerald Stifter, Minnetonka, MN (US); Thomas Martin Aune, Minnetonka, MN (US)

(73) Assignee: BL TECHNOLOGIES, INC., Minnetonka, MN (US)

( * ) Notice: Subject to any disclaimer, the term of this patent is extended or adjusted under 35 U.S.C. 154(b) by 732 days.

(21) Appl. No.: 16/214,510

(22) Filed: Dec. 10, 2018

(65) Prior Publication Data

US 2020/0179835 A1 Jun. 11, 2020

Related U.S. Application Data

(62) Division of application No. 14/533,862, filed on Nov. 5, 2014, now Pat. No. 10,179,426.
(Continued)

(51) Int. Cl.
*D01D 5/098* (2006.01)
*B01D 29/11* (2006.01)
(Continued)

(52) U.S. Cl.
CPC ............ *B01D 29/111* (2013.01); *B01D 29/15* (2013.01); *B01D 39/1623* (2013.01);
(Continued)

(58) Field of Classification Search
CPC .. B01D 29/111; B01D 29/15; B01D 39/1623; B01D 2239/065; B01D 2239/10;
(Continued)

(56) References Cited

U.S. PATENT DOCUMENTS 3,073,735 A 1/1963 Till et al.
3,251,475 A 5/1966 Till et al.
(Continued)

FOREIGN PATENT DOCUMENTS

CA 2142857 A1 3/1994
CA 2810064 A1 3/2012
(Continued)

OTHER PUBLICATIONS

Canadian Patent Application No. 2370787, Office Action dated Apr. 6, 2009.
(Continued)

*Primary Examiner* — Monica A Huson (57) ABSTRACT

A tubular depth filter element has three or more concentric zones. Each zone is made of an essentially continuous melt blown filament. The filament of an outer zone preferably has a larger diameter than the filaments of other zones. The outer zone overlaps with at least 85%, and preferably all, of another zone. Optionally, one or more additional filaments may traverse through all of zones. The depth filter element is made by spraying filaments onto a rotating mandrel to form a filament mass in contact with a conical press roller. The filaments are sprayed from three or more nozzles which are spaced apart along the length of the mandrel. One of the filaments is formed in a spray pattern that is angled towards an adjacent spray pattern so as to overlap with at least 50 or 85%, and preferably all, of the adjacent spray pattern.

9 Claims, 4 Drawing Sheets

Related U.S. Application Data (60) Provisional application No. 61/900,702, filed on Nov. 6, 2013.

(51) Int. Cl.
    *B01D 29/15*     (2006.01)
    *B01D 39/16*     (2006.01)

(52) U.S. Cl.
    CPC ..... *D01D 5/0985* (2013.01); *B01D 2239/065* (2013.01); *B01D 2239/069* (2013.01); *B01D 2239/0618* (2013.01); *B01D 2239/0622* (2013.01); *B01D 2239/10* (2013.01); *D10B 2321/022* (2013.01); *D10B 2505/04* (2013.01)

(58) Field of Classification Search
    CPC .... B01D 2239/0622; B01D 2239/0618; B01D 2239/069; B01D 2201/182; D01D 5/0985; D04H 3/16; D10B 2321/022; D10B 2505/04
    See application file for complete search history.

(56) References Cited

U.S. PATENT DOCUMENTS

| | | |
|---|---|---|
| 3,261,473 A | 7/1966 | Riede |
| 3,347,391 A | 10/1967 | Steensen |
| 3,353,682 A | 11/1967 | Pall et al. |
| 3,595,245 A | 7/1971 | Robert et al. |
| 3,801,400 A | 4/1974 | Vogt et al. |
| 3,825,379 A | 7/1974 | Lohkamp et al. |
| 3,825,380 A | 7/1974 | Harding et al. |
| 3,849,241 A | 11/1974 | Butin et al. |
| 3,904,798 A | 9/1975 | Vogt et al. |
| 3,933,557 A | 1/1976 | Pall |
| 4,021,281 A | 5/1977 | Pall |
| 4,116,738 A | 9/1978 | Pall |
| 4,173,443 A | 11/1979 | Lin |
| 4,225,642 A | 9/1980 | Hirakawa |
| 4,240,864 A | 12/1980 | Lin |
| 4,594,202 A | 6/1986 | Pall et al. |
| 4,676,807 A | 6/1987 | Miller et al. |
| 4,714,647 A | 12/1987 | Shipp, Jr. et al. |
| 4,726,901 A | 2/1988 | Pall et al. |
| 4,759,782 A | 7/1988 | Miller et al. |
| 4,861,633 A | 8/1989 | Abe |
| 5,279,731 A | 1/1994 | Cook et al. |
| 5,283,106 A | 2/1994 | Seiler et al. |
| 5,288,402 A | 2/1994 | Yoshida |
| 5,340,479 A | 8/1994 | Szczepanski et al. |
| 5,360,545 A | 11/1994 | Pall et al. |
| 5,366,576 A | 11/1994 | Clack |
| 5,409,642 A | 4/1995 | Allen et al. |
| 5,523,033 A | 6/1996 | Shambaugh |
| 5,591,335 A | 1/1997 | Barboza et al. |
| 5,681,469 A | 10/1997 | Barboza et al. |
| 5,980,759 A | 11/1999 | Proulx et al. |
| 6,074,869 A * | 6/2000 | Pall .................. B01D 61/18 422/429 |
| 6,358,417 B1 | 3/2002 | Aune et al. |
| 6,419,839 B1 | 7/2002 | Cox et al. |
| 6,580,813 B1 | 6/2003 | Hermanns et al. |
| 6,743,273 B2 | 6/2004 | Chung et al. |
| 6,800,117 B2 | 10/2004 | Barris et al. |
| 6,916,395 B2 | 7/2005 | Aune et al. |
| 6,938,781 B2 | 9/2005 | Aune et al. |
| 6,986,427 B2 | 1/2006 | Aune et al. |
| 7,008,465 B2 | 3/2006 | Graham et al. |
| 7,390,343 B2 | 6/2008 | Tepper et al. |
| 7,645,312 B2 | 1/2010 | Hamlin et al. |
| 2002/0063092 A1* | 5/2002 | Aune .................. B01D 39/163 210/496 |
| 2003/0080464 A1* | 5/2003 | Aune .................. B29C 48/345 264/211.14 |
| 2007/0062887 A1 | 3/2007 | Schwandt et al. |
| 2007/0102101 A1 | 5/2007 | Spearin et al. |
| 2007/0251876 A1 | 11/2007 | Krogue et al. |
| 2008/0128364 A1 | 6/2008 | Cloud et al. |
| 2008/0245719 A1 | 10/2008 | Beard et al. |
| 2008/0302074 A1 | 12/2008 | Gebert et al. |
| 2008/0314011 A1 | 12/2008 | Smithies et al. |
| 2009/0266048 A1 | 10/2009 | Schwarz |
| 2011/0210059 A1 | 9/2011 | Green et al. |
| 2013/0306562 A1 | 11/2013 | Stifter et al. |
| 2015/0122726 A1 | 5/2015 | Stifter et al. |

FOREIGN PATENT DOCUMENTS

| | | |
|---|---|---|
| CN | 1188422 A | 7/1998 |
| CN | 101039734 A | 9/2007 |
| CN | 101432056 A | 5/2009 |
| CN | 101754792 A | 6/2010 |
| CN | 102002820 A | 4/2011 |
| CN | 102858439 A | 1/2013 |
| CN | 203303753 U | 11/2013 |
| CN | 104321121 A | 1/2015 |
| DE | 202004017134 U1 | 7/2005 |
| EP | 0475708 A1 | 3/1992 |
| EP | 0880988 A1 | 12/1998 |
| FR | 1400619 A | 5/1965 |
| JP | S5096110 A | 7/1975 |
| JP | S5371369 A | 6/1978 |
| JP | S60216818 A | 10/1985 |
| JP | S6257626 A | 3/1987 |
| JP | S63287517 A | 11/1988 |
| JP | H01297113 A | 11/1989 |
| JP | 104244206 A | 9/1992 |
| JP | 2000053326 A | 2/2000 |
| JP | 2000271417 A | 10/2000 |
| JP | 2006527072 A | 11/2006 |
| JP | 2008057053 A | 3/2008 |
| JP | 2008525692 A | 7/2008 |
| JP | 2010179262 A | 8/2010 |
| WO | 9813123 A1 | 4/1998 |
| WO | 0062890 A1 | 10/2000 |
| WO | 2009088647 A1 | 7/2009 |
| WO | 2012034028 A2 | 3/2012 |

OTHER PUBLICATIONS

Canadian Patent Application No. 2370787, Office Action dated Jan. 18, 2010.
Canadian Patent Application No. 2370787, Office Action dated Oct. 22, 2010.
Chinese Patent Application No. 201680019986.4, First Office Action dated Jul. 15, 2019.
Chinese Patent Application No. 201180043354.9, Office Action dated Sep. 3, 2014.
Chinese Patent Application No. 201480061130.4, Office Action dated Nov. 15, 2016.
Chinese Patent Application No. 201680019986.4, Office Action dated Mar. 2, 2020—English Translation Available.
European Patent Application No. 02780520.9, European Search Report dated Nov. 25, 2004.
European Patent Application No. 02780520.9, Office Action dated Jun. 15, 2010.
Frank et al., "Electropositive Filtration Technology in Automobile Manufacturing Applications," WQA Aquatech, Mar. 2008, 8 Pages.
Gulf Patent Application No. GC2016/31230, Office Action dated Feb. 28, 2020.
Indian Patent Application No. 201647018621, First Examination Report dated Jul. 25, 2019.
International Patent Application No. PCT/US2000/10751, International Search Report dated Jul. 20, 2000.
International Patent Application No. PCT/US2002/33924, International Search Report dated Feb. 11, 2003.
International Patent Application No. PCT/US2011/051012, International Search Report and Written Opinion dated Oct. 2, 2013.
International Patent Application No. PCT/US2014/064125, International Preliminary Report on Patentability and Written Opinion dated May 19, 2016.

(56) References Cited

OTHER PUBLICATIONS

International Patent Application No. PCT/US2014/064125, International Search Report and Written Opinion dated Feb. 24, 2015.
International Patent Application No. PCT/US2016/025758, International Preliminary Report on Patentability dated Nov. 9, 2017.
International Patent Application No. PCT/US2016/025758, International Search Report and Written Opinion dated Jun. 17, 2016.
Japanese Patent Application No. 2017-550937, Office Action dated Jan. 9, 2020.
Japanese Patent Application No. 2000612024, Office Action dated Feb. 22, 2010.
Japanese Patent Application No. 2013528331, Notice of Allowance dated Nov. 1, 2016.
Japanese Patent Application No. 2013528331, Office Action dated Aug. 25, 2015.
Japanese Patent Application No. 2016-526779, Office Action dated Jul. 4, 2017.
Japanese Patent Application No. 2016-526779, Office Action dated Oct. 17, 2017.
Japanese Patent Application No. 2017-550937, Office Action dated Jun. 2, 2020—English Translation Available.
Komlenic, "Benefits of Alumina Nanofiber Technology for Drinking Water Filtration," AFS Spring Conference, May 2009, 34 Pages.
Kremen et al., "Silt Density Indices (SDI), Percent Plugging Factor (%PF): their Relation to Actual Foulant Deposition," Desalination, Sep. 1998, vol. 119 (1-3), pp. 259-262.
U.S. Appl. No. 14/533,862, Notice of Allowance dated Oct. 3, 2018.
U.S. Appl. No. 15/549,446, Restriction Requirement dated Nov. 25, 2019.
U.S. Appl. No. 09/550,814, Final Office Action dated Apr. 21, 2004.
U.S. Appl. No. 09/550,814, Non-Final Office Action dated Dec. 11, 2003.
U.S. Appl. No. 10/056,715, Final Office Action dated Mar. 12, 2004.
U.S. Appl. No. 10/056,715, Non-Final Office Action dated Apr. 9, 2003.
U.S. Appl. No. 10/056,715, Non-Final Office Action dated Jan. 18, 2005.
U.S. Appl. No. 10/056,715, Non-Final Office Action dated Sep. 12, 2003.
U.S. Appl. No. 10/278,247, Non-Final Office Action dated Jun. 21, 2004.
U.S. Appl. No. 10/278,247, Notice of Allowance dated Sep. 8, 2005.
U.S. Appl. No. 10/278,322, Notice of Allowance dated Apr. 27, 2005.
U.S. Appl. No. 10/279,043, Non-Final Office Action dated Dec. 1, 2004.
U.S. Appl. No. 10/279,043, Non-Final Office Action dated Jul. 2, 2004.
U.S. Appl. No. 13/821,742, Final Office Action dated Mar. 16, 2017.
U.S. Appl. No. 13/821,742, Non-Final Office Action dated Jul. 21, 2017.
U.S. Appl. No. 13/821,742, Non-Final Office Action dated Sep. 8, 2016.
U.S. Appl. No. 14/533,862, Final Office Action dated Aug. 21, 2017.
U.S. Appl. No. 14/533,862, Non-Final Office Action dated Jan. 11, 2018.
U.S. Appl. No. 14/533,862, Non-Final Office Action dated May 5, 2017.
U.S. Appl. No. 15/549,446, Non-Final Office Action dated Mar. 9, 2020.
U.S. Appl. No. 15/549,446, Final Office Action dated Jun. 30, 2020.
U.S. Appl. No. 15/549,446, Final Office Action dated Sep. 8, 2020.
Canadian Patent Application No. 2,928,705, Office Action dated Dec. 8, 2020.
European Patent Application No. 16717040.6, Communication pursuant to Article 94(3) EPC dated Feb. 19, 2021.
Indian Patent Application No. 201737028504, First Examination Report dated Dec. 17, 2020.
U.S. Appl. No. 15/549,446, Non-Final Office Action dated Apr. 7, 2021.
U.S. Appl. No. 15/549,446, Final Office Action dated Jul. 26, 2021.
Canadian Patent Application No. 2,928,705, Office Action dated Jun. 29, 2021.
U.S. Appl. No. 15/549,446, Advisory Action dated Oct. 1, 2021.
U.S. Appl. No. 15/549,446 Notice of Allowance dated Oct. 28, 2021.
U.S. Appl. No. 15/549,446 Notice of Allowability dated Dec. 22, 2021.
Canadian Patent Application No. 2,976,014, Office Action dated Jan. 20, 2022.
U.S. Appl. No. 15/549,446 Notice of Allowance dated Feb. 9, 2022.
Canadian Patent Application No. 2,928,705, Office Action dated Mar. 8, 2022.
Canadian Patent Application No. 2,976,014, Office Action dated Sep. 2, 2022.
Canadian Patent Application No. 2,928,705, Office Action dated Dec. 2, 2022.

* cited by examiner

LARGE FORMAT MELT-BLOWN DEPTH FILTER CARTRIDGE

RELATED APPLICATIONS

This application is a division of U.S. patent application Ser. No. 14/533,862 filed Nov. 5, 2014, which claims the benefit of U.S. provisional application 61/900,702, filed on Nov. 6, 2013, both of which are incorporated by reference.

FIELD

This specification relates to depth filter cartridges, to melt blown media and to methods of making them.

BACKGROUND OF THE INVENTION

A depth filter retains particles throughout the depth of a filtration media. Various media can be used to construct a depth filter, one of them being a non-woven media of melt blown or spun bond filaments. A depth filter may have multiple layers (or zones), with the layer having the largest pore size usually forming an upstream layer and the layer having the smallest pore size forming a downstream layer. This is in contrast to surface filters, alternatively called screen filters, which retain particles primarily by size exclusion on or near an upstream separation layer rather than throughout the depth of the filter. A surface filter may provide some depth filtration for particles below its rated absolute particle size, but the amount of depth filtration is limited by the surface filter's lack of thickness and the desire to make any layers behind the upstream separation layer as permeable as possible. A depth filter may be distinguished from a surface filter by way of the depth filter's substantial thickness, which is typically at least 5 mm and more often at least 10 mm. A depth filter is also typically provided in a configuration that provides a smooth inner and outer peripheral surface to maximize its volume whereas a surface filter is typically folded or pleated so as to maximize its surface area.

A cartridge filter is a removable or replaceable filter element designed to be placed in a housing. Some cartridge filters may be cleaned, but they are typically discarded at the end of their useful life. A depth filter cartridge may be rated according to its dirt holding capacity (DHC), which is measured in grams of solid particles that the filter can hold before plugging. The useful life of a cartridge is measured as the time the filter element can be operated under specified conditions before reaching a specified maximum pressure drop across the depth filter cartridge. The useful life of a cartridge may be limited by its DHC or by its mechanical ability to withstand the applied pressure as it becomes loaded with particles. Other rating criteria include the efficiency of the filter in removing particles of a specified size and the clean water pressure drop of the filter. For example, a removal efficiency rating may be specified as 90% removal of particles down to a specified micron size or as "absolute" (meaning 99%) removal of particles down to a specified micron size.

U.S. Pat. No. 6,986,427, issued on Jan. 17, 2006 to Aune et al., describes a melt blown non-woven media useful for a depth filter element. The media is made by directing a plurality of melt blown filaments at the side of a conical end of a tubular structure. The tubular structure rotates on a spinning mandrel. The tubular structure grows in length as material is added to its conical end while the tubular structure is drawn out of the filament spray area along the length of the mandrel. Different filaments are directed at different portions of the cone, and the filaments may vary in one or more characteristics along the length of the cone. This produces concentric annular zones in the tubular element with a corresponding variation in the one or more characteristics. One or more other melt blown filaments may be applied across the length of the cone to add filaments that extend through the depth of the element, crossing multiple zones, to strengthen the media.

U.S. Pat. No. 6,938,781, which shares a common priority application with U.S. Pat. No. 6,986,427, describes a nonwoven depth filter cartridge that includes a cylindrical mass of essentially continuous melt-blown polymer filaments and an essentially continuous traversing melt blown polymer filament extending through the mass. The cylindrical mass has a depth dimension, a longitudinal dimension, and a circumferential dimension. The filaments of the cylindrical mass are generally oriented in the longitudinal and circumferential dimensions and form a plurality of concentric zones. The traversing filament extends in the longitudinal dimension through a substantial portion of a length of the cylindrical mass while extending around the cylindrical mass in the circumferential dimension and extending radially in the depth dimension through substantially an entire thickness of two or more zones of the cylindrical mass.

Polypropylene depth filter cartridges made according to the patents described above are sold by GE Water and Process Technologies in association with the Z.PLEX trade mark. These cartridges have inside diameters of about 1 inch and outside diameters of about 2.5 or 2.75 inches. They are used in a number of water filtration applications.

INTRODUCTION TO THE INVENTION

The following introduction is intended to introduce the reader to the detailed description to follow and not to limit or define the claimed in invention. A claimed invention may be a sub-combination of elements or steps described below, or include an element or step described in other parts of this specification.

As indicated above, commercial depth filter cartridges made according to U.S. Pat. Nos. 6,938,781 and 6,986,427 have outside diameters of less than 3 inches. Large diameter filters, in particular filters with nominal outside diameters of more than 3 inches (8 cm) and up to 7 inches (18 cm), are typically constructed out of surface filters in a pleated filter format. A pleated filter cartridge with a nominal 6.5 inch outside diameter and 40 inch length may have a surface area of about 70-80 square feet. In contrast, a depth filter of the same size has a surface area of about 5 square feet at its outer surface and about 3 square feet at its inner surface. Because of this limited surface area, a conventional depth filter would not be expected to have a low clean water pressure drop, for example less than 0.5 psi at a flow rate of 40 US gallons per minute (gpm) in a nominal 40 inch long filter with a 90% removal efficiency for particles under 20 microns. However, depth filters have some advantages, including for example the ability to resist surface loading with organic or emulsified contaminants.

This specification describes a tubular depth filter element having three or more concentric zones. Each zone is made of an essentially continuous melt blown filament. Alternatively or additionally, each zone is made of one or more filaments, and the one or more filaments of an outer zone have a larger diameter than the one or more filaments of the other zones. An outer zone filament overlaps or intersects or both with the filament of another zone through at least 50 or 85%, and preferably all, of the depth of the other zone. Optionally, one or more additional filaments may traverse through all of the zones. An exemplary embodiment has 5 zones.

This specification also describes a method of making a depth filter element. Melt blown filaments are sprayed onto a rotating mandrel to form a filament mass in contact with a conical press roller. The filaments are sprayed from three or more nozzles which are spaced apart along the length of the mandrel. One of the filaments is formed in a spray pattern that overlaps with at least 50 or 85%, and preferably all, of the spray pattern of an adjacent filament. Preferably, the overlapping spray pattern is produced from a nozzle forming an outer zone that is angled at least 10 degrees relative to a line normal to the mandrel towards the next zone A depth filter element described herein provides a useful alternative to existing filter cartridges. The depth filter element may be used, for example, to provide a filter with an outside diameter of at least 4.5 inches, having a significant lifetime and low clean water pressure drop.

DETAILED DESCRIPTION

Approximating language, as used herein throughout the specification and claims, may be applied to modify any quantity that could vary without resulting in a change in the basic function to which it is related. Accordingly, a value modified by a term or terms such as "about" is not limited to the precise value specified. In some instances, the approximating language may correspond to the precision of an instrument for measuring the value. Range limitations may be combined and/or interchanged, and such ranges, and all sub-ranges, are included herein unless context or language indicates otherwise. Other than in the operating examples or where otherwise indicated, all numbers or expressions referring to quantities of materials, process conditions and the like, used in the specification and the claims, are to be understood as modified in all instances by the term "about".

"Optional" or "preferable" and similar terms mean that the subsequently described event or circumstance may or may not occur, or that the subsequently identified material may or may not be present, and that the description includes instances where the event or circumstance occurs or where the material is present, and instances where the event or circumstance does not occur or the material is not present. The term "may" is used to indicate conditions that might or might not be present.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements, but may include other elements not expressly listed or inherent to such process, method article or apparatus. The singular forms "a," "an" and "the" include plural referents unless the context clearly dictates otherwise.

Figure 1:
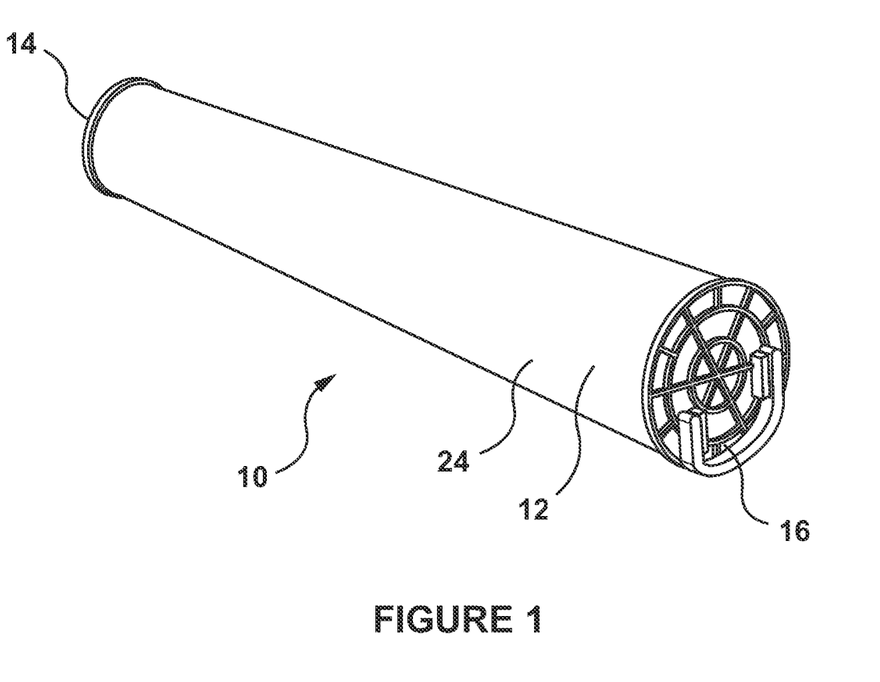
FIG. 1 is a photograph of a depth filter cartridge taken from its right side.
Figure 2:
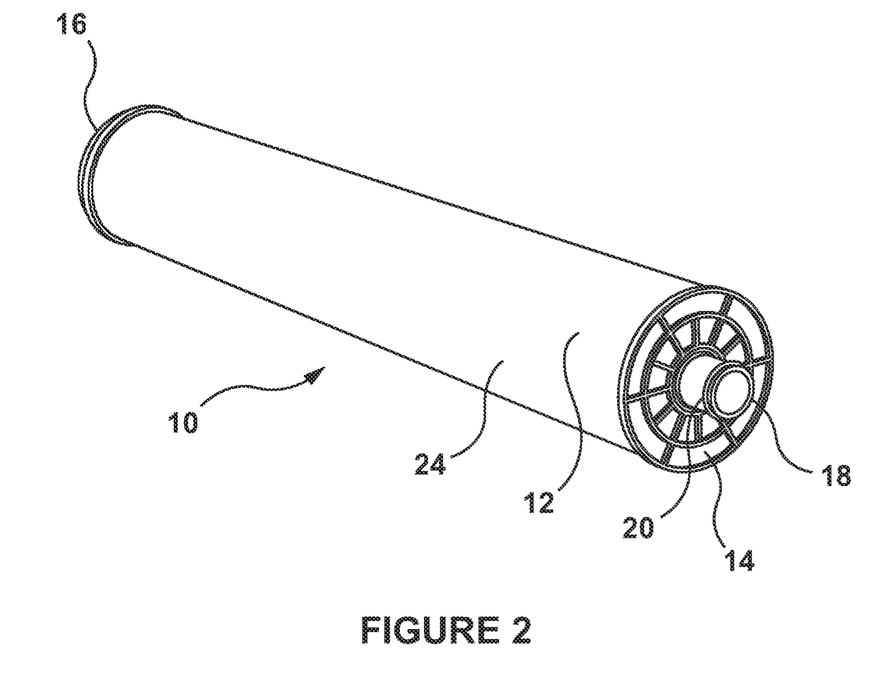
FIG. 2 is a photograph of the depth filter cartridge of FIG. 1 taken from its left side.

Referring to FIGS. 1 and 2, a depth filter cartridge 10 has a tubular depth filter element 12, a left side end cap 14 and a right side end cap 16. The words "left side" and "right side" are arbitrary and will be used in this description merely to provide a means to describe the cartridge 10 as it is oriented in the figures. The cartridge 10, or a part of it, may also be described as having length (measured in a longitudinal dimension parallel to a line between the left and rights sides of the cartridge), circumference (measured in a circumferential dimension along a circle perpendicular to the longitudinal dimension), or depth (measured in a radial dimension perpendicular to the circumferential dimension).

The end caps 14, 16 may be made of a thermoplastic material and are preferably thermally bonded to each end of the depth filter element 12 to form a seal with the ends of the depth filter element 12. Alternatively, the end caps 14, 16 may be bonded to the depth filter element 12 by an adhesive or by other means known in the art. The end caps 14, 16 fluidly separate the outside of the depth filter element 12 from the hollow center of the depth filter element 12. Preferably, a porous core tube (not visible) extends through the hollow center of the depth filter element 12 and is attached and sealed to the end caps 14, 16.

The depth filter cartridge 10 is typically used after inserting it into a housing or shell, not shown. The housing may hold one, or more than one, cartridge 10. In an outside-in filtration mode, feed water to be filtered flows through an inlet into a plenum defined by the inside of the housing and the outside of the cartridge 10. The feed water then flows through the depth filter element 12 and filtered water collects in the hollow center of the depth filter element 12 or the core tube. One or both of the end caps 14, 16 has an opening for the filtered water connected to an outlet of the housing. In the cartridge 10 shown, the left side end cap 14 includes an adapter 18 and a seal 20, which plug into an outlet of the housing. The seal 20 is an O-ring located in a groove in the adapter 18. Alternatively, a seal 20 may be formed by potting an elastomeric material in a groove to provide a planar annular gasket around an adapter 18 that is in the form of a simple hole, or by other means known in the art.

Figure 3:
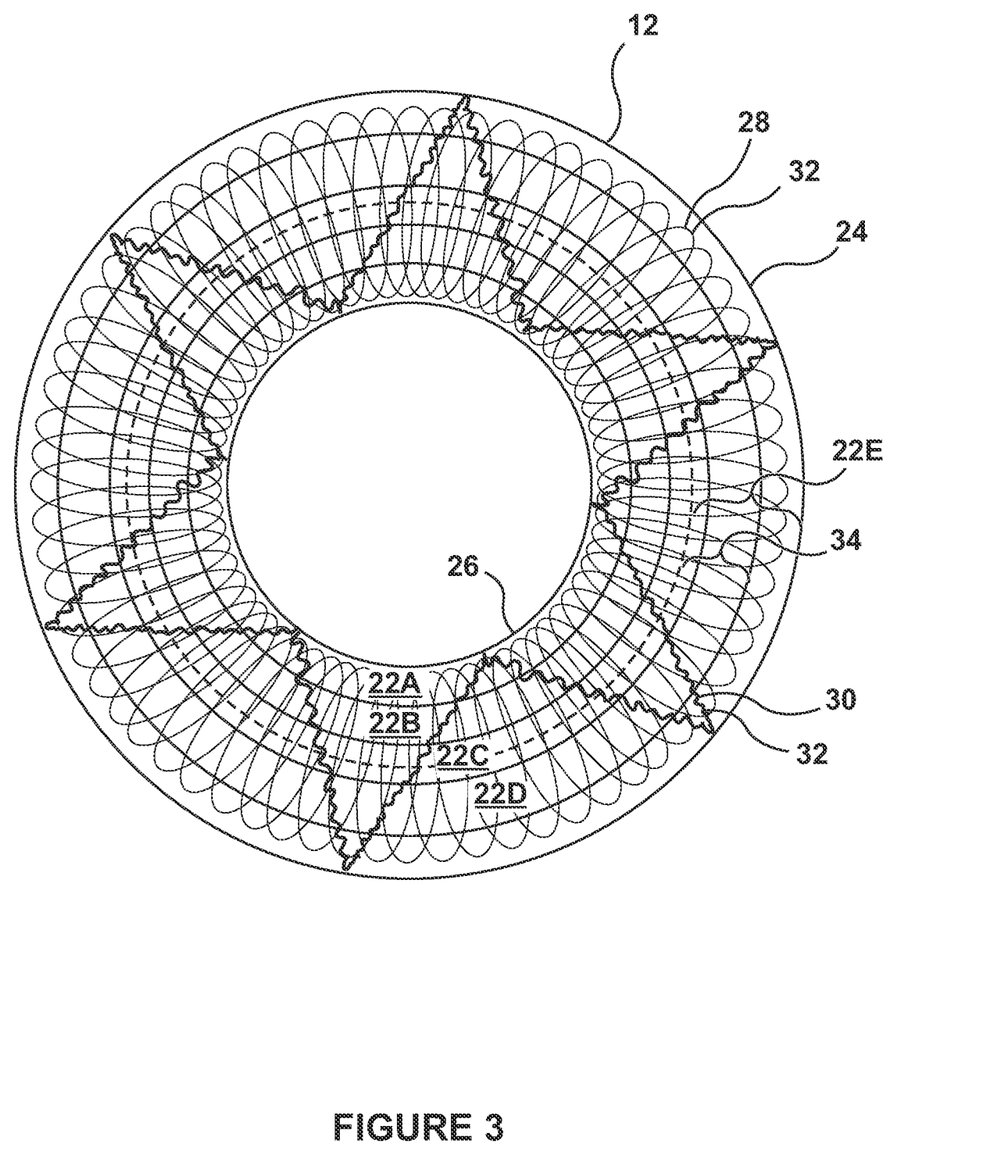
FIG. 3 is a schematic end view of the depth filter cartridge of FIG. 1 as it is being formed.

Referring to FIG. 3, the depth filter element 12 comprises a plurality of media layers or zones 22 through its depth. Preferably, the zones decrease in retention size (particle size removed at a given efficiency) from the outside surface 24 to the inside surface 26 of the depth filter element 12. Thus, large particles will be retained near the outside surface 24 and progressively smaller particles will be retained as the feed passes inwards through the depth filter element 12. Although the zones 22 are illustrated with a sharp line between them for ease of illustration, in practice there may be a more gradual transition, or a transitional area, between zones 22. Although 5 zones 22 are preferred, as shown, there could be more or less zones. In the depth filter element 12 of FIGS. 1 and 2, each of its five zones 22 has a different filament diameter and retention size with both the filament diameter and retention size decreasing towards the inside surface 26. Optionally two or more zones 22 may have the same filament diameter or retention size, but preferably while still providing an overall decrease in retention size towards the inside surface 26 for the depth filter element 12 as a whole.

In the example of FIGS. 1 and 2, the depth filter element 12 has an outside diameter of about 6.5 inches and an inside diameter of about 3 inches. The length of the cartridge 10 is about 38 inches, which corresponds with a nominal length of 40 inches. The adapter 18 is a standard type 226 fitting, although other suitable fittings may be used. The dimensions of the cartridge 10 may also be varied. For example, the outside diameter may be larger or smaller, preferably in the range of 3 inches to 9 inches, or 4.5 inches to 7 inches. The length may also be larger or smaller, for example a nominal 60-inch cartridge may be made. Optionally, a surface filter may be provided inside of the depth filter element 12 in the manner described in International Publication Number WO 2012/034028, which is incorporated by reference. In this case, the surface filter may, for example, rest on a core tube having an outside diameter of between about 1.1 inches and 3 inches and extend to an outside diameter of the inner surface filter of between about 2 inches and 4.5 inches.

The cartridge 10 of FIGS. 1 and 2 is made with a polypropylene (PP) depth filter element 12 and ABS end caps 14, 16 attached with an adhesive. The end caps 14, 16 are intended to be replaced in commercial embodiments with PP end caps 14, 16 thermally welded to the depth filter element 12 to provide a food contact compliant cartridge 10. Other materials useful for forming the depth filter element 12 include, for example, other polyolefins such as polyethylene, cellulose, polyamides, polyesters, and mineral fibers such as fiberglass. Multiple materials may be used in a single cartridge 10.

The depth filter element 12 may be made of melt blown media wherein each zone 22 is a mass formed of one or more essentially continuous polymer filaments. As will be described below in relation to FIG. 4, each zone 22 is made of polymer supplied from a melt blown filament delivery system. Subject to the possibility of random breaks, each zone 22 is made from a single essentially continuous filament. The filaments making up the zones 22 extend primarily in the longitudinal and circumferential directions. Preferably, the depth filter element 12 also comprises one or more multiple zone filaments 32. The multiple zone filaments 32 are essentially continuous polymer filaments extending in the depth dimension between two or more zones 22, preferably between all of the zones 22. In FIG. 3 (and in the cartridge of FIGS. 1 and 2) the multiple zone filaments 32 include static filaments 28 and Z-filaments 30 as described in U.S. Pat. Nos. 6,938,781 and 6,986,427.

As will be described further in relation to FIG. 4, filaments making up the zones 22 are built up into a mass layer upon layer by being sprayed from longitudinally spaced positions against a rotating conical end of the depth filter element 12 being formed. The multiple zone filaments 32 are similarly sprayed against the rotating conical end of the depth filter element 12 being formed, but these filaments 32 are sprayed in a pattern that extends longitudinally across multiple zones 22. A multiple zone filament 32 is not primarily responsible for forming any particular zone 22. The multiple zone filaments 32 collectively provide less than 50% of the filament mass in any zone.

The multiple zone filaments 32, among other things, improve fiber to fiber bonding and provide an interlocking element to the mechanical structure of the other filaments. In particular, the mass of the static filament or filaments 28 is highest, at least on a per unit volume but preferably also on an absolute basis, in the innermost zone or zones 22. The diameter of the static filament or filaments 28 may be about the same as or larger than the diameter of the filaments used in the innermost zone 22. A static filament 28 strengthens the inner zones 22, which would otherwise be weak in compression given the small filament diameter used in the inner zones 22 to provide retention of small particles.

The Z-filament or filaments 30 are sprayed in an oscillating pattern (rather than from a fixed delivery system) across the rotating conical end of the depth filter element 12 being formed. Oscillating the delivery system of a Z-filament 30 provides a filament mass that is concentrated (i.e. it has areas of higher and lower density) in the circumferential direction whereas a static filament 28 and the filaments making up the zones 22 have homogenous density in the circumferential dimension. A Z-filament 30 thereby links multiple zones 22, preferably all of the zones 22, together with compression resistant regions without greatly increasing the density of the depth filter element 12 as a whole. The mass of the Z-filament or filaments 30 is preferably between 2 and 20% of the mass of the depth filter element 12. Optionally, the per unit volume density of Z-filament 30 may be higher in inner zones 22 to further strength these zones. For example, Z-filament 30 may make up about 25% of the filament mass in the innermost zone 22 and about 3% of the filament mass in the outermost zone 22.

As shown in FIG. 3, the depth filter element 12 shown has five zones 22 labeled, from the innermost zone to the outermost zone, as zones 22A to zone 22E. These zones 22 may also be referred to as the first to fifth zones 22 respectively. The outer or fifth zone 22E includes a freestanding portion 32 and an overlapping portion 34. The overlapping portion 34 extends through at least 50 or 85% of, and preferably all, of at least one other zone 22. For example, the overlapping portion 34 in FIG. 3 extends across the entire fourth zone 22D and partially into the third zone 22C. Optionally, but not preferably, the freestanding portion 32 may be omitted. In a depth filter element 12 with more or less than 5 zones 12, the last zone is made as described for the fifth zone 22 above.

Preferably, though not shown in FIG. 3, a thin layer of bonding fibers is added over the outermost zone 22 as described in U.S. Pat. Nos. 6,938,781 and 6,986,427. The bonding fibers reduce the appearance of loose filament loops and provide a protective cage on the outer surface of the depth filter element 12. These bonding fibers may also shrink as they cool, which provides roughness to increase the effective surface area of the depth filter element 12.

While the Figures are directed to cylindrical filters, the same principles may be applied to a flat sheet or planar product. Such a flat product may be produced along a flat table with the filament sprayers oscillating across the width of the table or by cutting a depth filter element made on a large cylindrical mandrel along its length to obtain a sheet of material.

Figure 4:
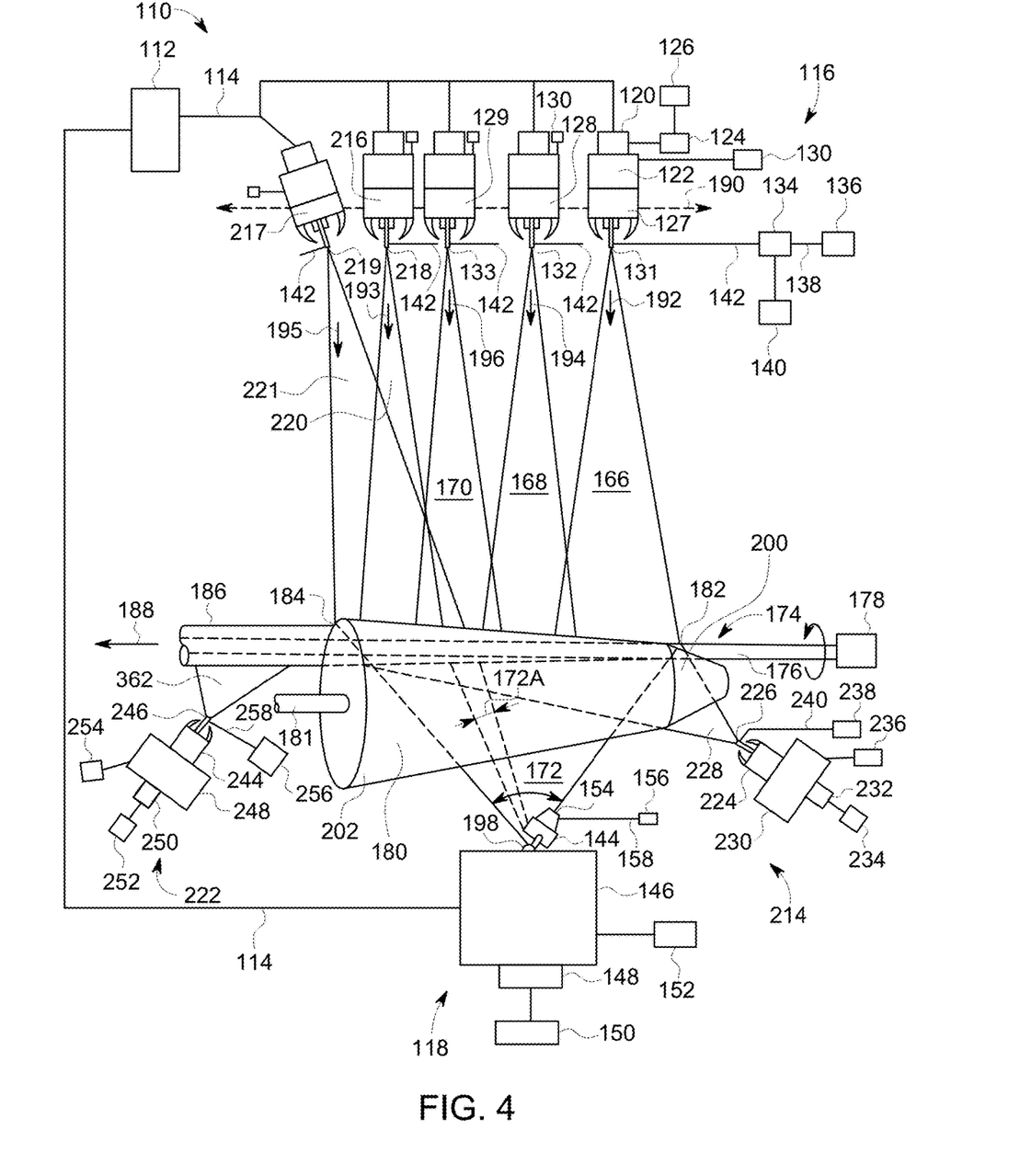
FIG. 4 is a schematic drawing of a machine for making the depth filter cartridge of FIG. 1.

FIG. 4 shows a system 110 for making a tubular depth filter media continuously to an indefinite length. The media can then be cut into a plurality of individual depth filter elements 12 of desired length. This system is similar to the system described in U.S. Pat. Nos. 6,938,781 and 6,986,427, for example FIG. 5 of U.S. Pat. No. 6,938,781, but with the addition of a filament delivery system to provide a fifth zone 22.

The system 110 includes motor driven screw type extruder 112, which is supplied with thermoplastic polymeric material from a source (not shown). Polypropylene is preferred but other materials such as polyesters, Nylon™, or polyurethanes may also be used for some or all of the filaments. Within extruder 112, the polymeric material is heated to a molten state, at which time it is metered and conveyed into heated delivery lines 114. The material is conveyed to two filament delivery systems 116 and 118.

Filament delivery system 116 includes, for each of five nozzles 127, 128, 129, 216 and 217, a motor driven gear type positive displacement metering pump 120 which receives molten polymeric material from heated delivery line 114 and pumps it to heater block 122. The speed of motor 124 which drives metering pump 120, and thus the rate at which the material is metered through pump 120 is electronically controlled by an appropriate controller 126. Motor 124 and controller 126 are shown for only nozzle 127 to simplify the figure, but would typically also be provided one for each of nozzles 128, 129, 216 and 217.

Each heater block 122, which is independently heated via heating means (not shown), is provided with an internal passage that leads to one of nozzles 127, 128, 129, 216 and 217. The heating means, and thus the temperature of the polymeric material within heater block 122, is controlled by temperature control 130. Each nozzle 127, 128, 129, 216 and 217 includes an orifice, the size of which may be selected as desired to assist in achieving a desired filament size or diameter. The molten material fed to each nozzle 127, 128, 129, 216 and 217 exits the respective orifice in a stream. Preferably, the size of the orifices increases across the nozzles 127, 128, 129, 216 and 217 from the right to the left side of FIG. 4 such that nozzle 127 has the smallest orifice and nozzle 217 has the largest orifice.

Associated with each nozzle 127, 128, 129, 216 and 217 are attenuating mechanisms 131, 132, 133, 218 and 219, which comprise a plurality of gas or air jets. Gas flowing out of the attenuating mechanisms 131, 132, 133, 218 and 219 functions to attenuate the stream of molten material exiting from nozzles 127, 128, 129, 216 and 217 to form polymeric filaments in a manner known in the art. Attenuating mechanisms 131, 132, 133, 218 and 219 accordingly may be of any design known in the art including that described in U.S. Pat. No. 4,173,443 by Lin, the disclosure of which is incorporated herein by reference.

Attenuating mechanisms 131, 132, 133, 218 and 219 are associated with an optional gas heater 134 and gas supply source 136. Gas supply source 136 provides gas via conduit 138 and appropriate valves and regulators to heater 134. The temperature of heater 134 is elevated or lowered to the desired temperature via temperature control 140. The gas is then fed from heater 134 through conduit 142 to attenuating mechanism 131. Attenuating mechanisms 131, 132, 133, 218 and 219 may be provided with gas from a common supply source or alternatively separately controlled gas sources may be employed for each attenuating mechanism 131, 132, 133, 218 and 219. In the case of a common gas supply, flow control valves (not shown) are typically provided so that each attenuating mechanism 131, 132, 133, 218, 219 may receive air at a different rate.

Filament delivery system 118 is substantially similar to that of system 116 described above, except that filament delivery system 118 preferably includes a means of delivering the filaments in such a manner as to actively intermingle with filaments produced by one or more of the nozzles used in system 116. Filament delivery system 118 may include one or more polymer extrusion nozzles. One embodiment uses a nozzle 144 and attenuator 154 connected to a sweep mechanism. Specifically, system 118 includes heater block 146, independently driven positive displacement metering pump 148 and motor 150. Heater block 146 is provided with temperature control 152. System 118 is also provided with attenuating mechanism 154 associated with nozzle 144. Pressurized gas is passed to attenuating mechanism 154 from gas supply source 156 via conduit 158. As with delivery system 116, each of the attenuators in system 118 can be associated with optional gas heaters, not shown. The provision of separate filament delivery systems 116 and 118 enables separate control and production of polymeric filaments produced by each part of system 116 and system 118.

Delivery systems 116 and 118 produce streams of discrete, essentially continuous polymer filaments which are distributed in flared patterns 166, 168, 170, 220, 221, 172 and 228 directed from nozzles 127, 128, 129, 216, 217, 144, 224 and attenuating mechanisms 131, 132, 133, 218, 219, 154 and 226 respectively, toward filament collection device 174. There is preferably some overlap in adjacent filament patterns 166, 168, 170 and 220 so that the filaments of each pattern connect with the filaments of the respective adjacent patterns, resulting in an integrated tubular filament mass. Further, filament pattern 221 overlaps with at least half of pattern 220, optionally at least 85% of pattern 220, preferably all of pattern 220, and more preferably also part of pattern 170. Filament collection device 174 includes central, rotatable collection device 176 such as a mandrel or drum, which extends from drive motor 178. Press roll member 180, which rotates about axle shaft 181, is disposed adjacent to mandrel 176 and spaced therefrom.

During operation, the essentially continuous polymer filaments of streams 166, 168, 170, 220 and 221 are directed in a flared pattern toward rotating mandrel 176 and collected thereon. While mandrel 176 is shown, it is contemplated that other collection devices may also be used, such as large diameter drums. Simultaneously, reciprocating or oscillating stream 172 deposits an essentially continuous filament or fiber stream that spans the distance between a far edge 182 of stream 166 and a far edge 184 of stream 221 and traverses the layers of filaments laid down by streams 166, 168, 170, 220 and 221. Rotating press roller 180 engages the filaments that have accumulated on rotating mandrel 176. As sufficient filaments are built up on mandrel 176, press roller 180 forces non-woven filament mass or fiber structure 186 off the axial end of mandrel 176 in the direction of arrow 188 to produce a continuous filament mass 186 of indefinite length. Filament mass 186 has a radial dimension, a longitudinal dimension, and a circumferential dimension. The entire filament collection device 174 may be similar to that described in U.S. Pat. No. 4,240,864 by Lin, the disclosure of which is incorporated herein by reference.

Nozzles 127, 128, 129, 216 and 217 are longitudinally aligned along common axis 190, which is preferably about 0-15 degrees offset from parallel to mandrel 176. Each nozzle 127, 128, 129, 216 and 217 includes an orifice that defines an axis 192, 194, 196, 193 and 195 respectively. Axes 192, 194, 196 and 193 are preferably perpendicular to axis 190 and about 0-15 degrees offset from perpendicular to mandrel 176. Axes 192, 194, 196, 193 and 195 generally correspond to the flow axis of molten polymer exiting the respective nozzle orifice. This orientation results in flared filament patterns 166, 168, 170, 220 and 221 being directed toward mandrel 176. Filament pattern 221 is preferably angled inwards, towards filament pattern 170, to assist in providing an overlap of filament pattern 221 with filament pattern 220 and optionally filament pattern 170. Filament pattern 221 is preferably angled by angling nozzle 217 inwards. Optionally, attenuator 219 can also be angled inwards.

As a non-limiting example, polymer filaments of filament patterns 166, 168, 170, 220 and 221 may be produced by extruding polypropylene heated to a temperature of between about 325 degrees C. and about 400 degrees C. at a rate of about 5 to 20 pounds per hour per nozzle while passing an ambient gas at a temperature of about 25 degrees C. at a rate of about 10 to 20 standard cubic feet per minute over the molten polymer stream exiting the nozzle orifice. The mandrel 176 may rotate at between 600 and 1000 rpm.

Filament pattern 172 comprises pattern 172A, which moves in a reciprocating, transverse pattern, preferably covering the distance between the primary pattern edges 182 and 184. Alternatively, filament pattern 172 covers less than the distance between edges 182 and 184. Filament pattern 172 preferably originates from one or more nozzles 144 located in a position above or below press roll 180 so that pattern 172 travels from nozzle 144 to mandrel 176 and lands on the forming filament mass 186 without spraying directly onto press roll 180.

Attenuating mechanism 154 preferably includes servo driven sweep mechanism 198 which allows attenuating mechanism 154 or nozzle 144 to sweep through an angle so that the filament pattern 172A traverses back and forth among fiber patterns 166, 168, 170, 220 and 221 along a longitudinal dimension of filament mass 186. As pattern 172A traverses fiber patterns 166, 168, 170, 220 and 221 it deposits essentially continuous polymer filaments across the overall laydown pattern which extends between the primary pattern edges 182 and 184.

In a preferred embodiment, sweep mechanism 198 comprises a servo drive motor with a cam and follower mechanism. Other suitable devices, such as AC/DC driven mechanical cranks and push rod mechanisms, for example, are also acceptable. In a preferred embodiment, sweep mechanism 198 runs at about 800 to 1000 oscillations per minute. As depicted, attenuating mechanism 154 of nozzle 144 is oriented to produce gas streams that result in flared filament pattern 172 being directed toward mandrel 176.

Preferably, the fiber of filament pattern 172 is still relatively liquid when it contacts the fibers of filament patterns 166, 168, 170, 220 and 221. Because a skin or shell has not completely formed on the fiber of filament pattern 172, it instantaneously adheres to the fibers of filament patterns 166, 168, 170, 220 and 221 upon contact. However, some attenuation or cooling of the fiber of filament pattern 172 is required to avoid melting of the fibers of filament patterns 166, 168, 170, 220 and 221.

As a non-limiting example, polymer filaments of filament pattern 172 are produced in the depth filter of the instant invention by passing polypropylene heated to a temperature of between about 325 degrees C. and about 400 degrees C. through a nozzle having an orifice size of about 0.016 inch at a rate of about 8 pounds per hour and passing at an ambient gas at a temperature of about 25 degrees C. at a rate of about 7 standard cubic feet per minute over the molten polymer stream exiting the nozzle orifice. Other suitable parameter combinations may also be used.

An accumulated mass of filaments 186 is produced on mandrel 176. Filament pattern 172 comprises reciprocating cone-shaped filament pattern 172A, which sweeps between pattern edges 182 and 184 to produce an overall wider cone-shaped pattern 172. In one embodiment, press roller 180 is oriented at an angle relative to mandrel 176 with nip 200 in contact with mandrel 176. As a non-limiting example, outer surface 202 of press roller 180 is angularly displaced by about 1 to 10 degrees relative to mandrel 176. In one embodiment, nip 200 contacts mandrel 176 close to edge 182 of filament pattern 166. Because of the angular placement of press roller 180, compression of filaments in collective filament mass 186 varies along the length of press roller 180. This results in a filament mass having a varying density gradient in the radial dimension, with the filament density of filament pattern 166 being generally greater than that of the filament masses comprised of outer filament patterns.

Fibers from filament patterns 166, 168, 170, 220 and 221 form a generally two-dimensional mat or layer of material that is continuously formed on mandrel 176 to build up filament mass 186 composed of many layers of fibers. These fibers can be described as being laid down in an X-Y plane, or in the longitudinal and circumferential (or latitudinal) dimensions. As the fibers are built up, layer upon layer, they produce a radial or depth dimension. The sweeping motion of filament pattern 172A, combined with the rotation of mandrel 176 causes the fibers coming from nozzle 144 to integrate into mass 186 as a "z" direction fiber, extending radially through the zones produced by filament patterns 166, 168, 170, 220 and 221. Filament patterns 166, 168, 170, 220 and 221 produce the zones 22 shown in FIG. 3. Z-filament 30 of FIG. 3 is produced by filament pattern 172. Z-filament 30 is preferably placed in a continuous manner from the inside to the outside and back to the inside of the zones 22 during approximately 120 degrees or less of rotation of the depth filter element 12.

System 110 preferably further includes filament delivery system 214 which is substantially similar to that of system 116 described above, except that filament delivery system 214 preferably includes a means of delivering the filaments in such a manner that they intermingle with filaments produced by one or more of the nozzles used in system 116. Filament delivery system 214 may include one or more polymer extrusion nozzles. One embodiment uses one nozzle 224 with attenuator 226, positioned at an acute angle relative to mandrel 176 to deliver a filament pattern or stream 228 which contacts filament mass 186 in an elliptical pattern which intermingles with filament patterns 166, 168, 170, 220 and 221 and those of filament delivery system 118.

Specifically, system 214 includes heater block 230, independently driven positive displacement metering pump 232 and motor 234. Heater block 230 is provided with nozzle 224 and temperature control 236. System 214 is also provided with attenuating mechanism 226 associated with nozzle 224. Pressurized gas is passed to attenuating mechanism 226 from gas supply source 238 via conduit 240. As with delivery system 116, attenuators 226 can be associated with an optional gas heater, not shown. The provision of separate filament delivery systems 118 and 214 enables separate control and production of polymeric filaments produced by each system 118 and 214, although each of the filament delivery systems 118 and 214 produces filaments which traverse filament mass 186 in a radial, or z, dimension. In one embodiment, the source of material for filament delivery system 214 is extruder 112 via delivery line 114; in another embodiment, the material source for system 214 is separate to provide alternate materials to those used in filament delivery systems 116, 118 and 214.

Delivery system 214 produces a stream of a discrete, essentially continuous polymer filament that is distributed in flared pattern 228 and directed from nozzle 224 and attenuating mechanism 226 toward filament collection device 174. During operation, the filament pattern 228 is directed in a flared pattern toward rotating mandrel 176. In one embodiment, filament pattern 228 spans the distance between a far edge 182 of stream 166 and a far edge 184 of stream 221.

In an alternative embodiment, filament pattern 228 does not span the distance between far edges 182 and 184, but does cover a significant portion of the forming layers of filament mass 186, e.g., the distance covered by filament pattern 228 is greater than the distance covered by each primary filament stream 166, 168, 170, 220 and 221 individually. Preferably the distance covered by filament pattern 228 is greater than the distance covered by two or more adjacent primary filament streams 166, 168, 170, 220 and 221. In one embodiment, nozzle 224 is placed at an acute angle of about 10 degrees to about 20 degrees relative to mandrel 176. Static filament 28 in FIG. 3 corresponds with the filament of spray pattern 228.

Shell-forming filament delivery system 222 is substantially similar to system 116 described above, except that shell-forming filament delivery system 222 is preferably configured and positioned to produce a relatively smooth outer shell zone on the exterior cylindrical surface of filament mass 186. Shell-forming filament delivery system 222 preferably uses a different location, polymer throughput rate, and air attenuation setting relative to filament delivery system 116. Compared to system 116, nozzle 244 is preferably placed closer to mandrel 176 and uses a lower polymer throughput rate; additionally, attenuating mechanism 246 uses less air attenuation. Similar to system 116, shell-forming filament delivery system 222 includes heater block 248, metering pump 250, motor 252, temperature control 254, gas supply source 256, and conduit 258. As a non-limiting example, polymer filaments of filament pattern 262 is produced by extruding polypropylene heated to a temperature of between about 270 degrees C. and about 325 degrees C. through nozzle 244 having an orifice size of about 0.016 inch at a rate of about 1 pound per hour and passing an ambient gas at a temperature of about 25 degrees C. at a rate of about 1.5 standard cubic feet per minute over the molten polymer stream exiting the nozzle orifice.

Nozzle 244 is preferably placed so that the filament produced thereby is deposited on the outer zone 22e formed by filament pattern 221. This configuration produces a very shallow zone or shell with significant fiber-to-fiber bonding, including some bonding between the fibers of the shell and the fibers of outer zone 22e. The fiber-to-fiber bonding of the shell essentially eliminates the presence of loose fibers on the surface of the finished depth filter element 12 and significantly increases the surface area of the resulting depth filter element 12.

Figure 5:
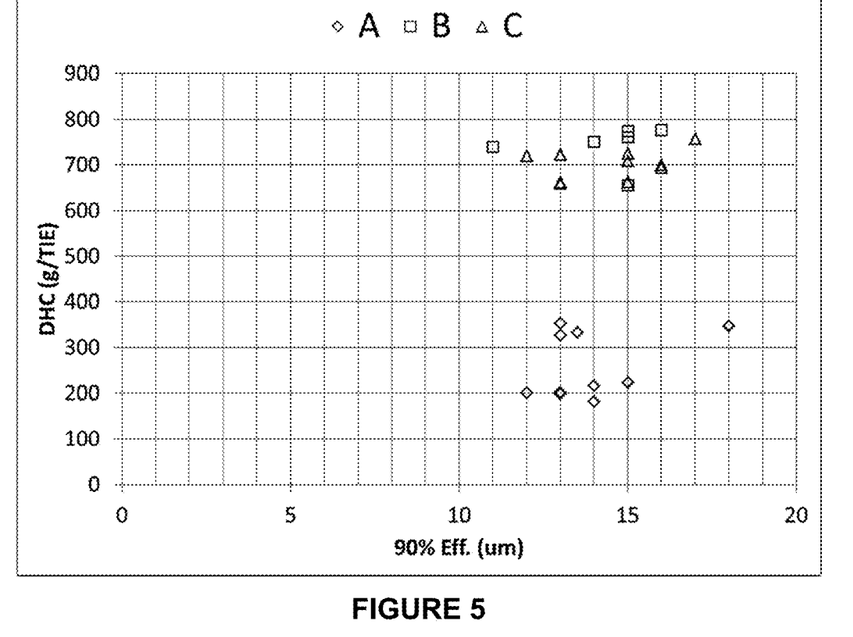
FIG. 5 is a graph of experimental results showing the dirt holding capacity of comparative four and five zone depth filter cartridges and a depth filter cartridge of FIG. 1.
Figure 6:
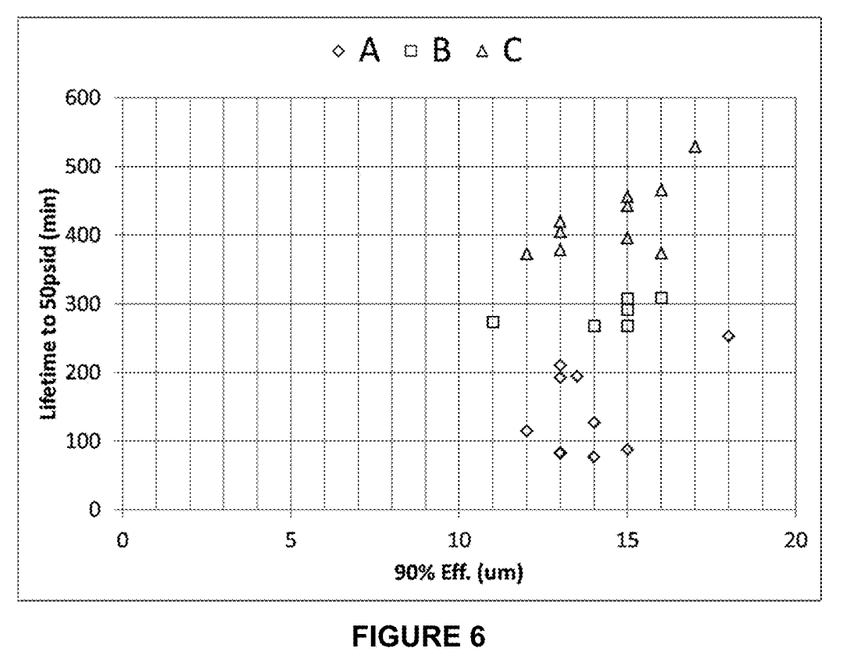
FIG. 6 is a graph of experimental results showing the lifetime of the depth filter cartridges tested in FIG. 5.

FIGS. 5 and 6 give the results of tests on several depth filter cartridges made according to three designs. Each of these cartridges had an outside diameter of about 6.5 inches and a nominal length of 40 inches (i.e. about 37 or 38 inches) and about 90% removal efficiency for 12 micron particles or 99% (absolute) removal of 70 micron particles. Filters A and B were made according to the method described in U.S. Pat. Nos. 6,938,781 and 6,986,427 with four and five minimally overlapping concentric zones respectively and static and Z form multi-zone filaments. Filters C was made as shown in FIGS. 1 to 4 with 5 zones, the fifth zone overlapping with zone 4 and part of zones 3, and similar static and Z form multi-zone filaments.

As shown in FIG. 5, each of Filters B and Filters C provided significantly more dirt holding capacity (DHC) than any of Filters A. However, as shown in FIG. 6, the lifetime to a pressure differential of 50 psi at 40 gpm for Filters C was significantly increased relative to both Filters A and Filters B. Based on these results and visual inspection of the filters, the inventors believe that Filters C were more resistant to compression than Filters B and that this property of Filters C was at least partially responsible for their improved lifetime relative to Filters B. Without intending to be limited by theory, the inventors believe that the overlap of filaments from the fifth zone into the fourth zone provides an increased density of filament to filament bonds, as well as allowing adequate filament density per unit volume in these zones despite the high rotational velocity of a large diameter filter element as it is made. The angled spray pattern of the fifth zone relative to the fourth zone may also further inhibit compression of the fourth zone.

In other tests, the clean water pressure differential (pressure drop) of Filters C was measured at between 0.2 and 0.4 psi at 40 gpm. Pressure drop remained negligible when the filters were operated at 80 gpm. A pressure drop of 1.0 psi was recorded at 100 gpm.

U.S. Pat. Nos. 6,358,417; 6,916,395; 6,938,781; and, 6,986,427 are incorporated herein by reference. International Publication Number WO 2012034028 is incorporated herein by reference.

One or more embodiments of the invention have been described in this detailed description with reference to the drawings to help disclose the invention and enable the invention to be practiced. However, the invention is defined by the claims and it is not intended to limit the claims to these specific examples or embodiments. The claims may include alternatives, modifications and equivalents.

We claim:

1. A method of making a depth filter element comprising the steps of:
   spraying essentially continuous melt blown filaments onto a rotating mandrel to form a filament mass in contact with a conical press roller wherein the filaments are sprayed from three or more nozzles which are spaced apart along a rotation axis of the mandrel and one of the essentially continuous melt blown filaments produced from a first nozzle of the three or more nozzles forming an outer zone of the filament mass is formed in a spray pattern that overlaps with at least 50% of a spray pattern from an adjacent nozzle of the three or more nozzles along the rotation axis of the mandrel; and,
   spraying Z-filaments across the filament mass,
   wherein the first nozzle is angled inwards towards the adjacent nozzle along the rotation axis of the mandrel, whereby the first nozzle and the adjacent nozzle have different angles with respect to the rotation axis of the mandrel.

2. The method of claim 1 wherein the spray pattern of the first nozzle overlaps with at least 85% of the spray pattern of the adjacent nozzle.

3. The method of claim 1 wherein the spray pattern of the first nozzle overlaps with all of the spray pattern of the adjacent nozzle.

4. The method of any one of claims 1 to 3 wherein the first nozzle is angled at least 10 degrees inwards relative to an axis through an orifice of the adjacent nozzle.

5. A machine making a depth filter element comprising,
   a) a rotatable mandrel having a rotation axis;
   b) a conical press roller;
   c) three or more nozzles which are spaced apart along the rotation axis of the mandrel and configured to spray melt spun filaments onto the mandrel to form a filament mass, and,
   d) a delivery system configured to spray Z-filaments across the filament mass,
   wherein a first nozzle of the three or more nozzles forming an outer zone of the filament mass is angled inwards towards a second nozzle of the three or more nozzles along the rotation axis of the mandrel, whereby the first nozzle and the second nozzle have different angles with respect to the rotation axis of the mandrel, and the first nozzle forms a spray pattern that overlaps with at least 50% of a spray pattern formed by the second nozzle along the rotation axis of the mandrel.

6. The machine of claim 5 wherein the spray pattern formed by the first nozzle overlaps with at least 85% of the spray pattern formed by the second nozzle.

7. The machine of claim 5 or 6 wherein the first nozzle is angled inwards at least 10 degrees relative to an axis through an orifice of the second nozzle.

8. The method of claim 1 wherein spraying the Z-filaments comprises spraying the Z-filaments in an oscillating pattern longitudinally across the filament mass.

9. The machine of claim 5 wherein the delivery system is oscillatable and configured to spray the Z-filaments in an oscillating pattern longitudinally across the filament mass.

\* \* \* \* \*